United States Patent [19]

Bauer et al.

[11] Patent Number: 5,037,604
[45] Date of Patent: Aug. 6, 1991

[54] COFFER DAM FOR TEMPORARY SHIELDING OF REACTOR VESSEL INTERNALS

[75] Inventors: Frank I. Bauer, Perry; Robert S. Mavretish, New Stanton; Noel P. Grimm, Monroeville, all of Pa.

[73] Assignee: Westinghouse Electric Corp., Pittsburgh, Pa.

[21] Appl. No.: 368,635

[22] Filed: Jun. 19, 1989

[51] Int. Cl.$^5$ ............................................. G21C 11/00
[52] U.S. Cl. .................................. 376/260; 376/203; 376/292; 250/517.1
[58] Field of Search ............... 376/292, 287, 289, 291, 376/263, 262, 260, 463, 203, 205; 250/515.1, 517.1, 518.1, 519.1

[56] References Cited

U.S. PATENT DOCUMENTS

| | | | |
|---|---|---|---|
| 2,943,035 | 9/1955 | Kallman | 376/263 |
| 3,752,738 | 7/1970 | Naymark | 376/293 |
| 3,775,246 | 11/1973 | Frisch et al. | 376/263 |
| 3,809,608 | 5/1974 | Katz et al. | 376/308 |
| 4,289,291 | 9/1981 | Goddard | 376/262 |
| 4,299,658 | 11/1981 | Meuschke et al. | 376/260 |
| 4,355,790 | 10/1982 | Krauss et al. | 266/252 |
| 4,654,188 | 3/1987 | Hankinson | 376/260 |
| 4,828,789 | 5/1989 | Hankinson et al. | 376/287 |

FOREIGN PATENT DOCUMENTS 0043394 2/1980 European Pat. Off. .
2442891 6/1980 France .

OTHER PUBLICATIONS

"In Place Thermal Annealing of Nuclear Reactor Pressure Vessels", NUREG/CR 42/2, EGG-125-6708, 4/85.
Letter dated 2/19/88, Miselis to Del George re Soviet Lecture.

Primary Examiner—Daniel D. Wasil
Attorney, Agent, or Firm—M. G. Panian

[57] ABSTRACT

A cylindrical coffer dam assembly is described for use in temporary shielding personnel from nuclear reactor stored internals' radiation. The coffer dam is made up of substantially equal segments small enough to pass through the equipment hatch of the reactor containment building. The segments are pre-fabricated at a factory, transported to the plant, introduced individually into the containment building, and assembled together in sealing relation at the operating floor into a complete coffer dam. The coffer dam is moved to the reactor vessel and connected to the reactor vessel upper flange in sealing relation. The coffer dam can be disconnected, disassembled, removed and re-used at other nuclear reactors.

17 Claims, 4 Drawing Sheets

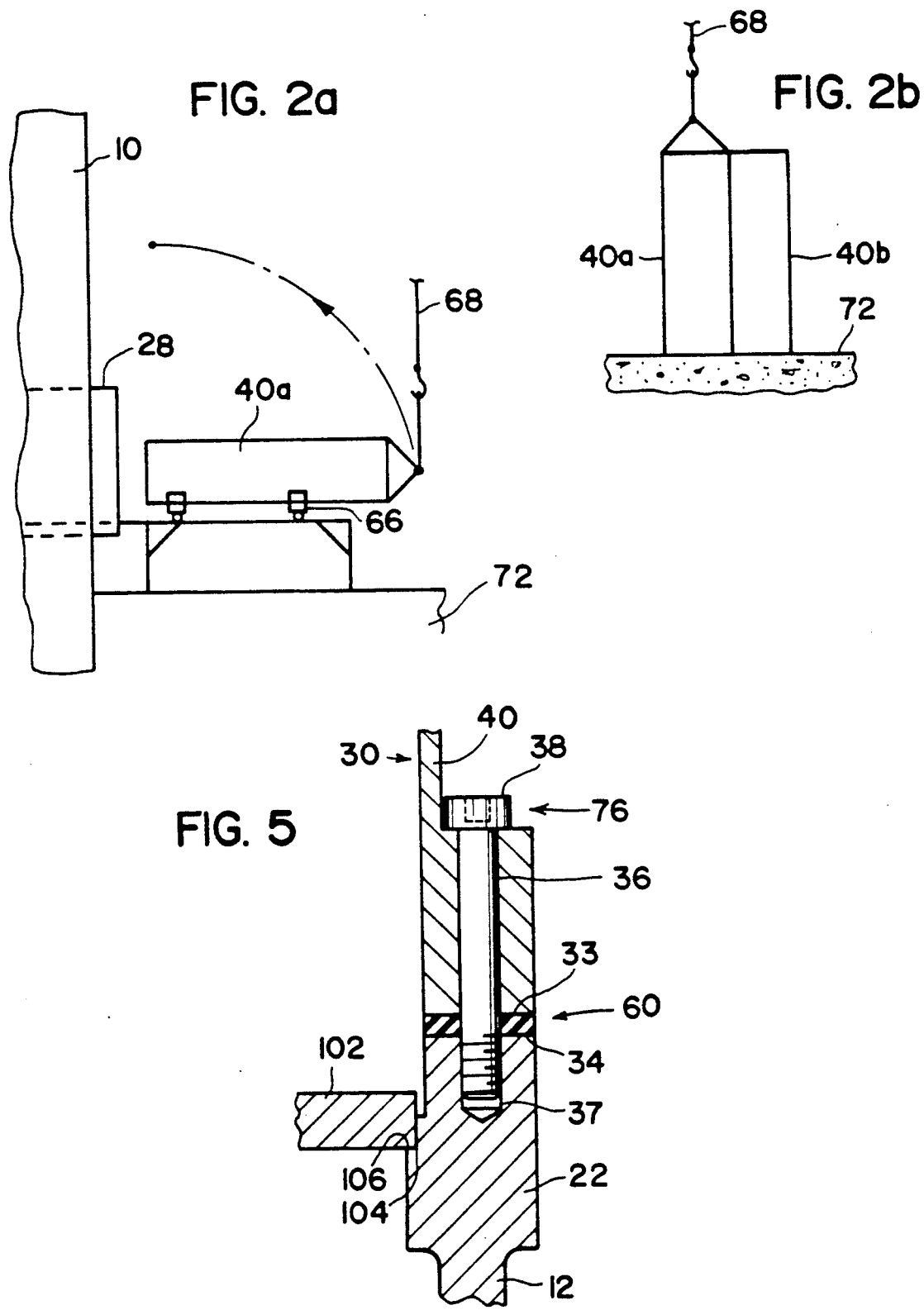

COFFER DAM FOR TEMPORARY SHIELDING OF REACTOR VESSEL INTERNALS

CROSS REFERENCES TO RELATED APPLICATIONS

This application and the following co-assigned, co-pending U.S. patent applications relate to reactor vessel annealing: U.S. Pat. application Ser. Nos. 07/368,454 entitled "Modular Annealing Apparatus For In Situ Reactor Vessel Annealing And Related Method of Assembly," Bauer and Mavretish; 07/368,433 entitled "Water Filled Tanks For Temporary Shielding of Reactor Vessel Internals and Method of Assembly," Grimm and Sejvar; and 07/368,503 entitled "Annealing Unit Insertion and Removal System," Reiner and Kordaliski.

BACKGROUND OF THE INVENTION

This invention relates to shielding radioactivity emanating from reactor vessel stored internals and, more particularly, to temporarily shielding personnel from the stored internals during operations such as in situ reactor vessel annealing.

DESCRIPTION OF THE PRIOR ART

At various times during the operational life of a nuclear reactor, there is a need to remove the fuel and internals from the reactor vessel. Such instances include inspections, reactor vessel annealing, etc.

In particular regard to annealing, as a result of constant bombardment by neutron radiation during a nuclear reactor's operation over time, the metal in certain portions of a nuclear reactor vessel tends to lose its ductility and becomes brittle. This decreases the safety margin when cold water must suddenly be introduced into the vessel cooling system as a result of a malfunction. Brittleness, consequently, is a major concern impacting the safe operating life of the reactor vessel.

It is known that annealing can restore the ductility of the metal so that the useful life of the reactor can be safely prolonged. Annealing is a process of heating and cooling a substance such as steel to make the steel less brittle. In order to avoid the creation of additional stresses, a major portion of the reactor vessel must be annealed.

To perform annealing, the nuclear reactor is shut down, the reactor vessel is opened, the fuel is stored in a fuel storage pit and the reactor upper and lower internals are stored. Due to the extremely high radiation levels of the stored internals and the reactor vessel, they are stored underwater in a refueling canal to significantly reduce the personnel radiation exposure during the operations involved in the installation and use of the annealing apparatus.

In order to place the annealing apparatus in the reactor vessel and to allow workers to make the necessary heater connections and actuate thermocouples used for temperature sensing, the region directly above the reactor vessel should be dry. Further, water must eventually be removed from the reactor vessel to reach the required annealing temperature. Removal of this water would remove the radiation shielding from the stored reactor internals in fluid communication with the reactor vessel, thereby endangering the personnel.

It is known that the radiation emitted from the stored internals can be blocked using temporary shielding in the form of a coffer dam, as described in EPRI, Jan. 1983, P-2712, entitled "*Feasibility of Methodology for Thermal annealing an Embrittled Reactor Vessel*," and NUREG/CR 42/2, EGG-125—6708, Apr. 1985, entitled "*In Place Thermal Annealing of Nuclear Reactor Pressure Vessels.*"

More particularly, a unitary cylindrical coffer dam is seated directly on the bottom of the refueling canal adjacent the vessel and extends to the top of the refueling canal. By flooding the canal, the internals are shielded by the water and the annealing apparatus can be introduced into the reactor vessel through the top of the coffer dam.

However, with this method, water leakage is known to occur into the reactor vessel at the interface of the coffer dam and the bottom of the refueling canal. This seal is weak because of the uneven surface of the bottom of the refueling canal and because this type of shielding merely relies on the weight of the coffer dam to create the seal clamp force.

Further, the conventional coffer dam, which is fabricated in a factory and intended for a large commercial reactor vessel, is very difficult to transport due to its size since containers suitable for truck or train transport are limited in size.

An additional feasibility concern of the conventional coffer dam includes the ability to get a coffer dam as big in diameter as the reactor vessel flange through a containment building equipment hatch. The equipment hatch opening is significantly smaller than the diameter of the reactor vessel, making entry of a one-piece coffer dam impossible without major modification to the containment structure. There is a strong desire to keep the containment structure as intact as possible. Further, any modification to the containment building would require rigorous requalification and verification of the containment's integrity, which is a very costly and time-consuming activity and would, most likely, require Nuclear Regulatory Commission approval.

Because of the problems inherent in the abovedescribed conventional coffer dam, some efforts at temporary shielding have been directed away from coffer dams. For example, in the above-referenced application entitled "*Water Filled Tanks...*" a set of vertical, water-filled tanks interposed between the stored internals and the reactor vessel, and a set of horizontal tanks placed above the stored internals and the vertical tanks, are described. However, such tanks are not necessarily suitable for all reactor designs, such as where very limited space exists between the reactor vessel and the stored internals in the refueling canal.

In light of the above a need exists for reliable and leak-proof temporary shielding of stored internals, which allows the reactor vessel to be drained of water, is applicable to various reactor designs, allows a safe work place for personnel, and which lends itself to a relatively easy method of assembly.

SUMMARY OF THE INVENTION

Accordingly, it is a purpose of the present invention to provide a coffer dam pre-fabricated in segments in a factory, which segments can be easily transported to a nuclear reactor, introduced individually into the hatch of the containment building, assembled as a complete coffer dam and installed on the reactor vessel flange.

It is another purpose of the present invention to provide a coffer dam which reliably seals the interior of the reactor vessel from the water-filled refueling canal.

It is another purpose of the present invention to provide a coffer dam which can be easily disassembled and removed from the containment building, and a related method for disassembly and removal.

It is another purpose of the present invention to provide a coffer dam and a related method of assembly which allow the coffer dam to be reused at a plurality of reactors.

It is another purpose of the present invention to provide a method of assembling a coffer dam requiring a minimum of personnel involvement in the containment building.

To achieve the foregoing and other purposes of the present invention, there is provided a coffer dam assembly made up of a plurality of vertical and/or horizontal cylindrical segments small enough to pass through the equipment hatch of the containment building. The segments are manufactured at a factory, transported to the containment building and introduced individually into the containment building via the containment hatch. The segments are then assembled at a low radiation area of the operating floor into a total coffer dam using a minimum of effort and personnel intervention. Seals are placed between the edges of each of the segments and along a bottom flange of the coffer dam. The edges of the segments are bolted together and the completed coffer dam is positioned on and bolted directly to the reactor vessel flange in sealing relation. The bolting can be accomplished, either before or after the annealing apparatus is inserted into the reactor vessel, using long handled tools while the refueling canal is flooded. A cover is connected in sealing relation to the top of the coffer dam to control airborne radiation during annealing and is hinged to allow personnel entry when needed.

The method invention includes the steps of: pre-fabricating the segments at a factory; transporting a plurality of the segments to the reactor; introducing each segment through the hatch of the containment building; assembling the plurality of segments in sealing relation into a coffer dam; and installing the coffer dam in sealing relation to the reactor vessel flange.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2a is a schematic view illustrating introduction of one segment of the coffer dam through the containment hatch and uprighting of the segment.

FIG. 2b is a schematic view illustrating the positioning of a segment of the coffer dam adjacent another segment on the operating floor.

FIG. 5 is a side, cross-sectional view of the area of attachment and seal of the coffer dam to the reactor vessel flange.

DETAILED DESCRIPTION OF THE PREFERRED EMBODIMENTS

The present invention will now be described in detail with reference to FIGS. 1-6.

These Figures show a typical Westinghouse, 3-loop pressurized, water reactor (PWR) nuclear power plant. The actual arrangements of nuclear power plants, however, vary by specific plant. Also, 2-loop and 4-loop PWR plants have similar but different arrangements, as known in the art. The present invention can be readily adapted by those of ordinary skill in the art to all these different plant arrangements, number of loops, plus non-Westinghouse PWR plant designs.

Figure 1:
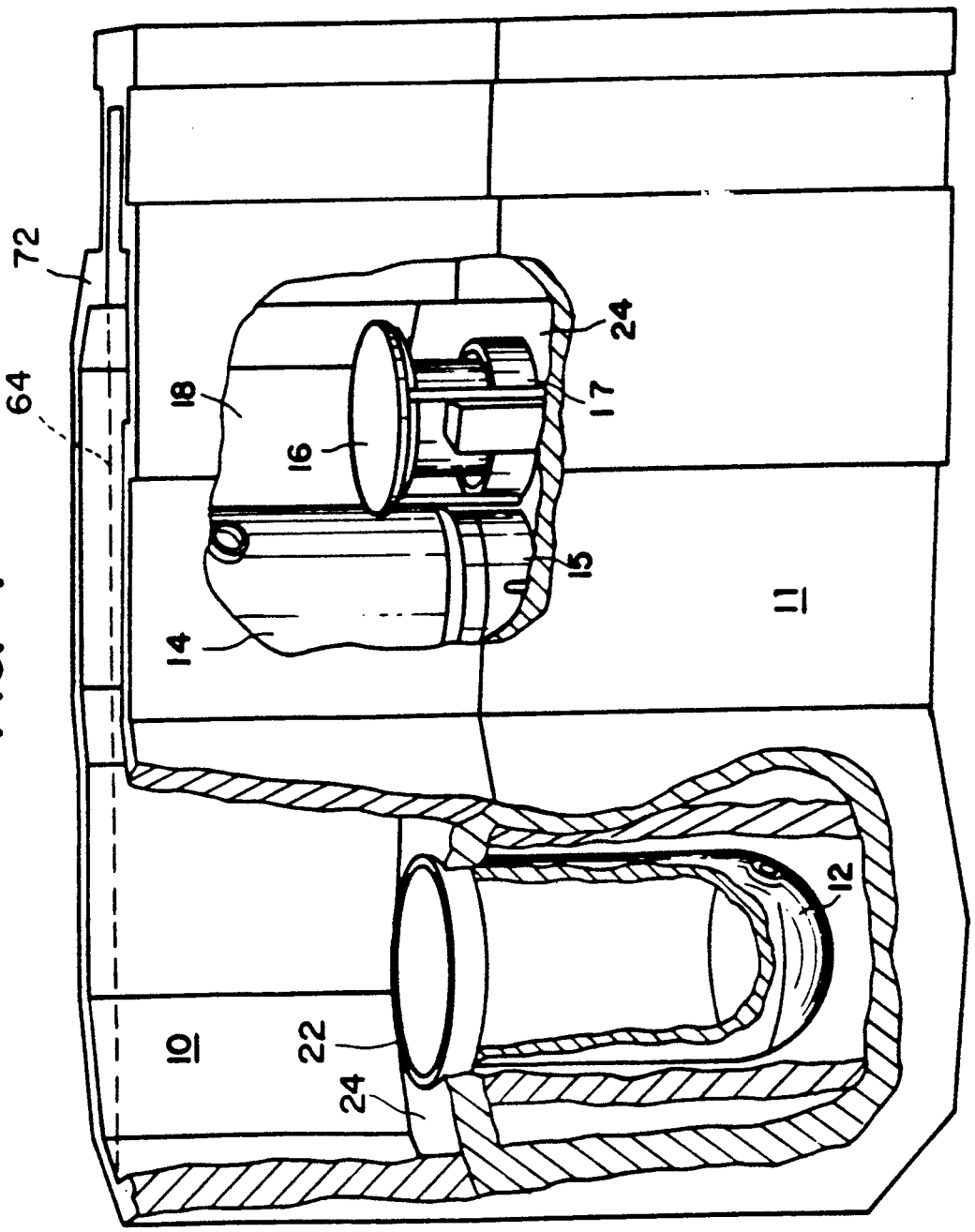
FIG. 1 is a perspective view of the containment building, illustrating particularly, the relative positions of the reactor vessel and the stored internals.

FIG. 1 is a perspective view of the containment building 10 with a cutaway in the front left of a forward concrete wall 11 to show the reactor vessel 12 therein. The reactor vessel 12 is an elongated, generally cylindrically shaped member of a familiar design for use in a nuclear reactor system. The reactor vessel 12 has the usual hemispherical bottom and a plurality of inlet and outlet primary system water nozzles (not shown).

In FIG. 1 the reactor vessel 12 closure head and fuel (not shown) have already been removed and the radioactive lower and upper internals, 14 and 16, respectively, have been removed and stored. The front right portion of the wall 11 is also cutaway to show the internals 14, 16 in their respective storage racks, 15, 17, in a refueling canal 18. The refueling canal 18 is located above the reactor vessel 12, with an upper flange 22 of the vessel 12 being generally coplanar with the floor or bottom 24 of the refueling canal 18.

The reactor vessel 12 as shown in FIG. 1 is under the refueling condition and is ready for, e.g. in situ annealing. At this time, water in the refueling canal 18 is at maximum level 64 shown in FIGS. 1 and 6.

Before introducing an annealing apparatus into the reactor vessel 12, precautions must be taken to prevent radiation emitted by the stored internals 14, 16 from being introduced into the area at which the annealing apparatus will be installed and hooked up by human assistance for operation. In this regard, a coffer dam according to the present invention is used for temporary shielding. The structure of the coffer dam will now be described with reference to FIGS. 2-6, wherein the coffer dam is generally referred to by reference numeral 30.

The coffer dam 30 is cylindrical and generally includes: a plurality of segments 40; first sealing means 50 positioned between fit up flanges or edges 42 of adjacent segments 40; first connecting means 70 for attaching together the edges 42 of adjacent segments 40; second sealing means 60 positioned between a bottom flange 32 of the completed coffer dam 30 and the reactor vessel upper flange 22; and second connecting means 76 for attaching the bottom flange 32 to the reactor vessel upper flange 22.

FIGS. 2a and 2b are schematic views illustrating introduction of the segments 40 according to the present invention into the containment building 10 and assembly thereof into the completed coffer dam 30. Each segment 40 is pre-fabricated in a factory and is a one-piece, curved, metal member. Although only one segment 40 is shown in FIG. 2a, a plurality of segments are assembled to form the coffer dam 30, as 40 described below. Accordingly, each segment 40 may be referred to as 40a, 40b, etc.

Figure 4:
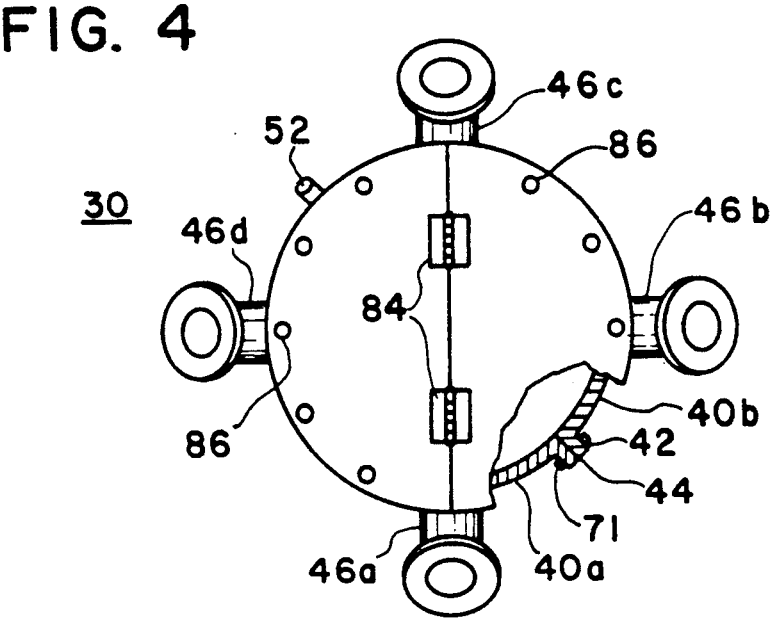
FIG. 4 is a top, partial, cross sectional view of another embodiment of the coffer dam, illustrating particularly vertical cylindrical segments, and vertical fit up flanges or edges.

In the preferred embodiment of the coffer dam 30 shown in FIGS. 2a, 2b and 4, each segment 40 is an elongated vertical cylindrical section, i.e. each is an equal longitudinal curved section of the total cylindrical coffer dam 30. If four segments 40 are used, each segment 40 is curved 90 degrees; if three segments, 120 degrees; and so on.

Figure 3:
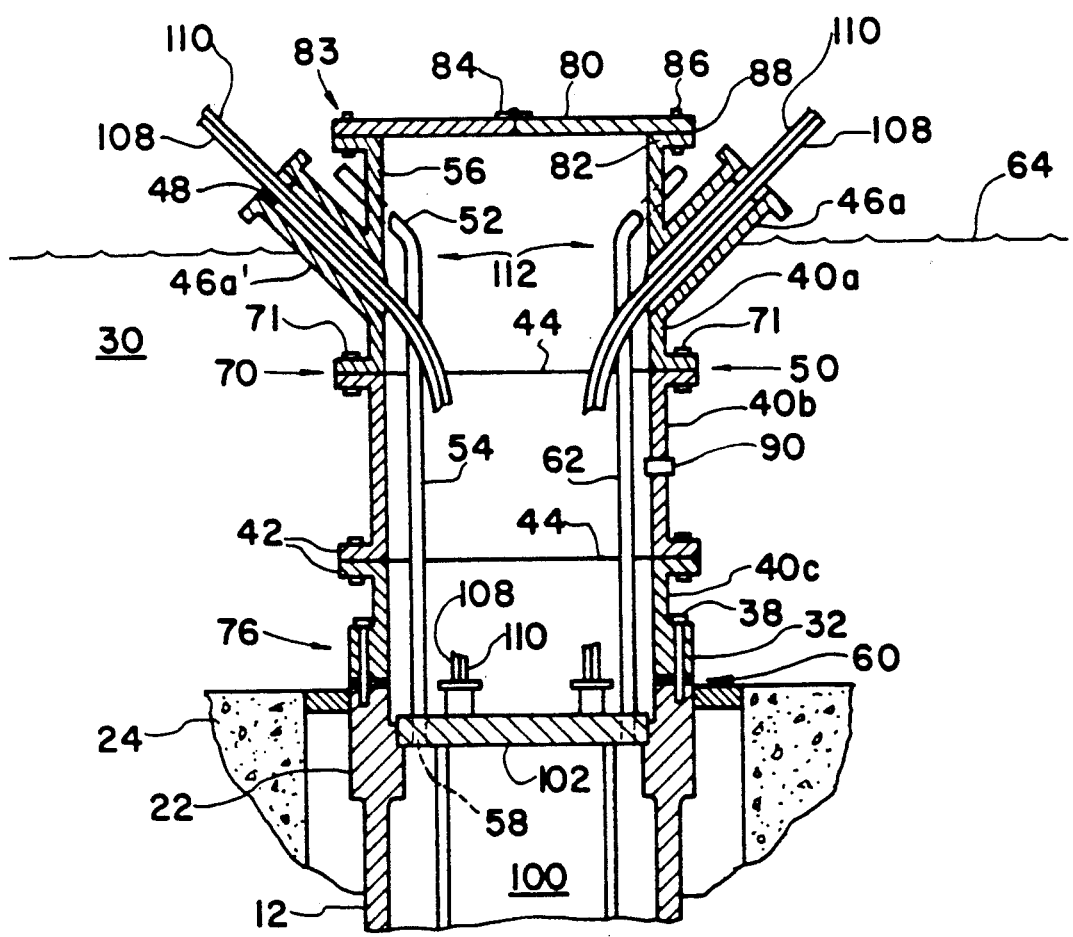
FIG. 3 is a side, cross-sectional view of one embodiment of the coffer dam according to the present invention, illustrating particularly horizontal cylindrical segments and horizontal fit up flanges or edges, side ports used to direct the annealing apparatus connections out of the coffer dam, seating/bolting of the coffer dam on the reactor vessel flange and an annealing apparatus mounted in the reactor vessel.

In an alternate embodiment shown in FIG. 3, each segment 40 is a horizontal cylindrical section, i.e. each is a cross sectional portion of the cylinder.

Figure 6:
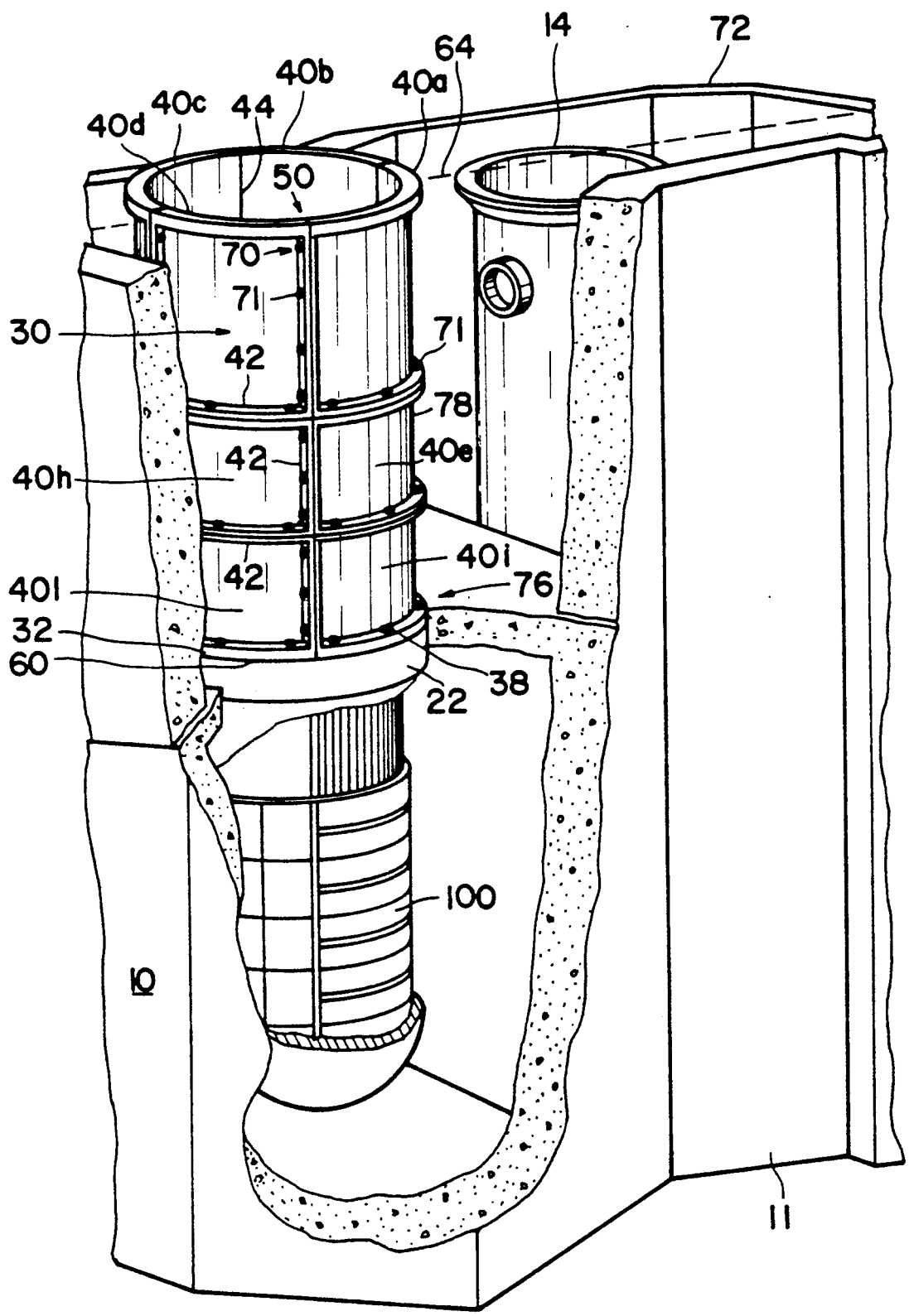
FIG. 6 is a perspective view of an embodiment of the coffer dam including both vertical and horizontal segments installed on a reactor vessel flange, with an annealing apparatus positioned in the reactor vessel.

Further, as shown in FIG. 6, if desired the coffer dam 30 can be made of a combination of vertical and horizontal sections 40 connected together.

In any case, the segment 40 size is selected, most importantly, so as to fit through the equipment hatch 28 of the containment building 10 and yet still correspond to the reactor vessel 12 size. The choice of segment 40 size and quantity can also be varied to satisfy other manufacturing, transport and plant specific conditions.

Referring again to the preferred embodiment of the present invention shown in FIG. 4, each of the four vertical segments 40 can include a side port 46a, 46b, etc. which is used to direct the annealing apparatus connections out of the coffer dam 30 to a control station (not shown). The alternate embodiments of the segments 40 shown in FIGS. 3 and 6 can also include side ports 46 in the uppermost segments 40.

As shown in FIGS. 2a and 2b, and as described more fully below, each segment 40 is brought into the containment building 10 and preferably assembled by humans in a low radiation area of the operating floor 72.

In this regard, each segment 40 includes vertical and horizontal fit up flanges or edges 42. Adjacent edges 42 are mated and connected by the first connecting means 70, such as bolt and nut combinations 71. The lowermost set of horizontal fit up flanges or edges 42 form the bottom flange 32 of the completed coffer dam 30, whereas the uppermost set of horizontal fit up flanges or edges 42 form the upper flange 82 of the coffer dam 30.

Each of the segments 40 can be pre-fabricated to contain the sealing means described below. Alternatively, all or some of the sealing means could be installed when the segments 40 are being assembled on the operating floor 72.

More particularly, the coffer dam 30 includes the first sealing means 50 between the edges 42 of adjacent segments 40. As the first sealing means 50 strip seals 44 can be used as shown in FIGS. 4-6. Because the outside 78 of the coffer dam 30 (see FIG. 6) is in contact with refueling canal water, temperatures are reduced, allowing the first sealing means 50 to be, e.g. rubber composition or metal. Such sealing means 50 helps resolve a significant feasibility issue by allowing a plurality of segments 40 to be passed through the hatch 28 and to form the complete coffer dam 30.

Once the segments 40 are connected together to form the completed coffer dam 30, the coffer dam 30 is moved and attached to the reactor vessel flange 22.

As shown in FIG. 5, a seating surface 33 of the bottom flange 32 mates with a closure head seating surface 34 of the reactor vessel flange 22 with the second sealing means 60 therebetween. The type of second sealing means 60 used in this area depends on the thermal design requirements of the reactor vessel flange 22 during the annealing operation. Where high temperatures in the reactor vessel upper flange 22 area are required to minimize thermal gradients and residual stresses, the second sealing means 60 will be a thermal insulator gasket-type seal in combination with metallic and non-metallic O-rings. For those applications where low temperatures at the reactor vessel upper flange 22 can be tolerated, the second sealing means 60 can be merely low temperature O-rings.

The pressure differential across the second sealing means 60 is low (max 15 PSI), thus allowing a wide range of allowable second sealing means 60, flange 32 and second connecting means 76 combinations.

The bottom flange 32 of the coffer dam 30 is connected to the reactor vessel flange 22 via the second connecting means 76. Such connecting means 76 can be, e.g. a threaded bolt 38 arrangement. More particularly, the bottom flange 32 of the coffer dam 30 has sufficient holes 36 to allow the completed coffer dam 30 to be bolted to the threaded holes 37 formed in the reactor vessel 12 for receiving the closure head.

This bolt down arrangement prevents a catastrophic seal failure as the flanges 32, 22 can be in intimate contact. This arrangement also resolves a significant feasibility problem of the conventional coffer dam described in the "Description of the Prior Art" section, suora, which has no bolt down feature. That is, the coffer dam was merely seated on the bottom of the refueling canal outside of the reactor vessel and employed the weight of the coffer dam to create the seal clamping force.

Long handled tools (not shown) can be used from the operating floor 72 to bolt the coffer dam 30 to the reactor vessel flange 22. In this way, the lowest possible personnel exposure to radiation is obtained. If personnel were to work around the reactor vessel flange 22 to connect the coffer dam 30 directly to the flange 22, with only the reactor vessel 12 filled with water, radiation exposure to the personnel coming from the stored internals 14, 16 would be high.

Nevertheless, if radiation from the stored internals 14, 16 were adequately shielded by other means, the coffer dam segments 40 can be assembled directly on the reactor vessel upper flange 22 or personnel can be used at the reactor vessel upper flange 22 to connect the bolts 38, if desired.

With the coffer dam 30 installed on the reactor vessel 12, the refueling canal 18 is flooded to shield the radiation emitting from the stored internals 14, 16.

As shown in FIG. 3, a conventional seal leak detection means 90, with passage to the dry side of the first and second sealing means 50, 60 can be incorporated for monitoring seal effectiveness.

As shown in FIGS. 3, 5 and 6, an annealing apparatus 100 is then inserted in the reactor vessel 12, with a lower seating surface 106 of a top plate 102 thereof seated on the reactor vessel internals seating ledge 104. This structure frees up the reactor vessel closure head seating surface 34 to allow the seating surface 33 of the coffer dam 30 to be seated thereon. This change eliminates the need for sealing the top plate 102 of the annealing apparatus 100 to the vessel 12.

Workmen (not shown) in the area above the annealing apparatus 100 hook up the various heater power leads 108, thermocouples 110, etc. known in the art. The power leads 108 and thermocouples 110 are led out of the coffer dam 30 through the side ports 46. These ports 46 are then closed by sealant plugs 48. The side ports 46 project above the water level 64 in the refueling canal 18 so water cannot enter the coffer dam 30. These ports 46 and the access cover plate 80, discussed below, are sealed to prevent any potential airborne radiation particles that might be released during heat up and cool down from being released to the containment atmosphere.

That is, the annealing process incorporates an inward air movement concept to control airborne radiation particles. A vacuum pulls on the internal vessel volume and the exhaust is passed through an external filter. Any air leakage which might occur around seals for the thermocouples 110 and power cables 108 and the access cover plate 80 are inward. The vacuum is required only to be slightly under atmospheric pressure as there is only a slight pressure differential.

The access cover plate 80 is also introduced through the equipment hatch 28. The access cover plate 80 is secured to the upper flange 82 of the coffer dam 30 by third connecting means 83 and sealed via third sealing means 88, such as an O-ring. Sealing at this point above the water line 64, significantly removed from the heat sources, allows for use of low temperature seals.

The access cover plate 80 can be made of two, semicircular sections joined to each other by fourth connecting means 84 such a hinges, pins or bolts. Of course, the access cover plate 80 could be made in more sections than two if desired.

The access cover plate 80/side ports 46 combination: allows for man entry to the top of the annealing apparatus 100 for initial installation and hook-up of power leads 108, thermocouples 110, other instrumentation, and piping while the refueling canal 18 is filled; allows man entry during operation for maintenance, inspection and dismantling; no disconnections of thermocouples 110 or power leads 108 are required for man entry into the coffer dam 30; allows for easy exit of the power leads 108 and thermocouples 110; allows for easy installation of the annealing assembly 100; and allows thermocouple 110 actuation and adjustment during annealing.

The coffer dam 30 according to the present invention also provides for effective control of air flow to the internal volume of the reactor vessel 12 which is maintained at a negative pressure during the annealing process to control airborne contamination. A vacuum system 112 is used for maintaining the reactor vessel 12 at a slight negative pressure. The system 112 enters the coffer dam 30 at a side port 52 with piping 54 going along the interior wall 56 of the coffer dam 30 and entering the reactor vessel 12 through a connection 58 in the annealing apparatus top plate 102. Similar routing is made for a vent line 62 to the interior of the reactor vessel 12.

In contrast to the temporary shielding discussed in the above referenced co-pending application entitled "Water Filled Tanks...," wherein vertical and horizontal water tanks are used between the reactor vessel and stored internals, the coffer dam 30 of the present invention allows for water shielding of the stored internals 14, 16 even in reactors where the refueling canal 18 is small and the internals 14, 16 are installed in close proximity to the reactor vessel 12. In some instances, however, it may be desired to use both supplementary lead or steel shielding hanging on the coffer dam 30 at the closest point of the coffer dam 30 relative to the stored internals, if the radiation reading merits same.

The method of assembling the coffer dam segments 40 according to the present invention will now be described in greater detail with reference to FIGS. 2-6.

As seen in FIG. 2a, each pre-fabricated segment 40 can be shipped from the factory in, e.g. a strong back reusable shipping frame 66, to the reactor site. At the site the shipping frame 66 and a segment 40a are transferred to the interior of the containment building 10 through the equipment hatch 28.

Once inside containment, the segment 40a is released from the shipping frame 66 and upended using a containment crane 68 in a low radiation area of the operating floor 72. This upending operation is enhanced by a shipping frame 66 which has included upending features such as pivot pins and internal rails or rollers to permit upending vertically under the natural crane hook positions without loss of control or undue loading of the segments 40 or the shipping frame 6.

As suggested above, each segment 40 can be pre-fabricated at the factory to include the first, second and third sealing means, where necessary, or the sealing means can be installed when the coffer dam segments 40 are assembled on the operating floor. Then, with the segments 40 assembled and the seals captured in place, the coffer dam 30 is lowered onto the reactor vessel flange 22 and connected in sealing relation to the reactor vessel 12.

The next step in the annealing process is to introduce the annealing apparatus 100 into the reactor vessel 12 and pump the remaining water from the reactor vessel 12 and coffer dam.

A suitable annealing apparatus is described in the above-referenced application entitled "Modular Annealing Apparatus For In Situ Reactor Vessel Annealing And Related Method of Assembly."

Once the annealing apparatus 100 is inserted into the reactor vessel 12, the power leads 108, thermocouples 110, etc. are led by the workmen out the side ports 46 to the control station. The access cover plate 80 is then introduced into the containment building 10 and connected in sealing relation as described above via the bolts 86.

FIGS. 3 and 4 illustrate the annealing apparatus 100 in the reactor vessel 12 and the complete coffer dam 30 installed above the annealing apparatus 100. In these embodiments, side ports 46 and an access cover plate 80 are used. In contrast, FIG. 6 is a perspective view of an alternate embodiment, wherein the side ports 46 and cover 80 are not used; the connections (not shown) for the annealing apparatus 100 are led directly out the top of the coffer dam 30.

Once the annealing apparatus 100 is inserted and hooked up, annealing of the reactor vessel is performed.

As would be understood by one having ordinary skill in the art, after annealing is performed, the coffer dam 30 can be disassembled and removed from the containment building 10 by merely reversing the steps described above. In this way, the coffer dam 30 can be reused by transporting same to other reactors. Further, should the coffer dam 30 require repairs, the entire coffer dam 30, a segment 40 thereof or the access cover plate 80 can be transported back to the factory where the repair can be performed.

The foregoing is considered illustrative only of the principles of the invention. Further, since numerous modifications and changes will readily occur to those skilled in the art, it is not desired to limit the invention to the exact construction and operation shown and described. For example, although the present invention is described as particularly suitable to annealing operations, the invention is also equally applicable to other situations where the internals are stored and some work must be performed in the reactor vessel such as scheduled inspections or weld repairs. Accordingly, all suitable modifications and equivalents may be resorted to that fall within the scope of the invention and the appended claims.

We claim:

1. A structure for shielding stored internals' radiation from an area where a reactor vessel is housed in a containment building, comprising:
   a plurality of segments introducible through an equipment hatch of the containment building, said segments being connectable to each other into a coffer dam and being connectable to an upper flange of the reactor vessel;
   first connecting means for connecting said segments to each other to form the coffer dam;
   first sealing means positionable between said segments for forming a seal therebetween;
   second connecting means for connecting the resulting coffer dam to the upper flange of the reactor vessel; and
   second sealing means for forming a seal between the coffer dam and the upper flange of the reactor vessel.

2. The structure as recited in claim 1, wherein the first connecting means comprises:
   a plurality of bolt and nut combinations connecting adjacent segments.

3. The structure as recited in claim 1, wherein the first sealing means comprises:
   a strip seal between adjacent segments.

4. The structure as recited in claim 1, wherein the second connecting means comprises:
   a plurality of bolts connecting a bottom flange of the coffer dam to the upper flange of the reactor vessel.

5. The structure as recited in claim 1, wherein the second sealing means comprises:
   one of an O-ring and gasket between a bottom flange of the coffer dam and the upper flange of the reactor vessel.

6. The structure as recited in claim 1, wherein each segment comprises:
   an equal vertical section of a cylinder.

7. The structure as recited in claim 1, wherein each segment comprises:
   a horizontal section of a cylinder.

8. The structure as recited in claim 1, wherein each segment comprises:
   one of a vertical and horizontal section of a cylinder.

9. The structure as recited in claim 1, wherein at least one segment comprises a side port.

10. The structure as recited in claim 1, further comprising an access cover plate connected to an upper flange of the coffer dam by third connecting means and third sealing means.

11. The structure as recited in claim 10, wherein the third connecting means comprises a plurality of bolts.

12. The structure as recited in claim 10, wherein the third sealing means comprises an O-ring.

13. The structure as recited in claim 10, wherein the cover comprises:
   a two-piece, circular member connected by fourth connecting means.

14. A method for assembling a coffer dam relative to a reactor vessel housed in a containment building, comprising the steps of:
   (a) introducing a plurality of segments through an equipment hatch of the containment building; and
   (b) assembling the plurality of segments to each other in sealing relation with sealing means between the segments to form a coffer dam; and
   (c) fixedly connecting the coffer dam to an upper flange of a reactor vessel in sealing relation.

15. A method for assembling a coffer dam used in an operation requiring human intervention in a containment building, comprising the steps of:
   (a) pre-fabricating a plurality of segments at a location outside the containment building;
   (b) transporting the plurality of segments to the containment building;
   (c) introducing each of the plurality of segments into the containment building;
   (d) connecting the plurality of segments to each other in sealing relation with sealing means between the segments to form a coffer dam;
   (e) fixedly connecting the coffer dam to an upper flange of the reactor vessel in sealing relation.

16. A method for shielding stored internals' radiation in preparation for annealing a reactor vessel in a containment building, comprising the steps of:
   (a) removing nuclear fuel from the reactor vessel;
   (b) removing and storing upper and lower core internals underwater in a refueling canal;
   (c) introducing a plurality of segments individually through a hatch in the containment building;
   (d) connecting the plurality of segments to each other in sealing relation with sealing means between the segments to form a coffer dam;
   (e) fixedly connecting the coffer dam to an upper flange of the reactor vessel in sealing relation;
   (f) placing an annealing apparatus in the reactor vessel;
   (g) pumping water from the reactor vessel and coffer dam;
   (h) annealing;
   (i) filling the reactor vessel with water;
   (j) removing the annealing apparatus.

17. The method as recited in claim 16, further comprising the steps of:
   (k) disconnecting the coffer dam from the reactor vessel upper flange;
   (1) disassembling the coffer dam; and
   (m) removing the plurality of segments from the containment building.

* * * * *